(12) United States Patent
Milliner et al.

(10) Patent No.: US 7,945,008 B2
(45) Date of Patent: May 17, 2011

(54) SYSTEMS AND METHODS FOR LATTICE ENUMERATION-AIDED DETECTION

(75) Inventors: David L. Milliner, New Orleans, TX (US); Anuj Batra, Dallas, TX (US); Srinath Hosur, Plano, TX (US); Deric W. Waters, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 644 days.

(21) Appl. No.: 12/032,309

(22) Filed: Feb. 15, 2008

(65) Prior Publication Data

US 2008/0198943 A1 Aug. 21, 2008

Related U.S. Application Data

(60) Provisional application No. 60/890,128, filed on Feb. 15, 2007.

(51) Int. Cl.
*H04L 7/00* (2006.01)
(52) U.S. Cl. .................................................... 375/367
(58) Field of Classification Search .................. 375/267, 375/299, 347, 349, 367; 700/53; 455/101, 455/132–141
See application file for complete search history.

(56) References Cited

U.S. PATENT DOCUMENTS

| 7,233,634 | B1 | 6/2007 | Hassell Sweatman et al. | |
|---|---|---|---|---|
| 7,317,771 | B2 * | 1/2008 | Brunel | 375/347 |
| 2005/0157806 | A1 * | 7/2005 | Walton et al. | 375/267 |
| 2009/0122897 | A1 * | 5/2009 | Belogolovy et al. | 375/267 |

OTHER PUBLICATIONS

Barry, J. R. et al; Digital Communication; 3rd Ed.; 2004; pp. 517-521; Kluwer Academic Publishers.
Chan, A. and Lee, I., "A new reduced-complexity sphere decoder for multiple antenna systems"; IEEE Conference on Communications, 2002, pp. 460-464.
Foschini, G. J. et al.; "Simplified Processing for High Spectral Efficiency Wireless Communication Employing Multi-Element Arrays," IEEE Journal. Selected Areas in Communication.; 1999; pp. 1841-1852; vol. 17, No. 11.
Hochwald, B. M. and ten Brink, S.; "Achieving Near-Capacity on a Multiple-Antenna Channel"; IEEE Transcripts on Communications.; Mar. 2003, pp. 389-399, vol. 51, No. 3.
Waters, D. W.,"Signal Detection Strategies and Algorithms for Multiple-Input Multiple-Output Channels"; Georgia Institute of Technology; PhD Dissertation; Dec. 2005, available at http://etd.gatech.edu.
Wubben, W. et al., "Efficient algorithm for decoding layered space-time codes;" Electronic Letters; Oct. 2001; pp. 1348-1350; vol. 37, No. 22.
Zhao W. and Giannakis, G. B.; "Sphere Decoding algorithms with improved radius search"; IEEE Communications and Networking Conference, Mar. 2004, pp. 2290-2294, vol. 48.
Chan, Albert M., A New Reduced-Complexity Sphere Decoder for Multiple Antenna Systems; 2002 IEEE; pp. 460-464.
Radosavljevic, Predag and Cavallaro, Joseph R., Soft Sphere Detection with Bounded Search for High-Throughput MIMO Receivers; pp. 1175-1179, 2006.
Wong, Kai-Kit; On the Decoding Order of MIMO Maximum-Likelihood Sphere Decoder: Linear and Non-Linear Receivers; 2004 IEEE; pp. 698-703.
Bertozzi, Tanya and Le Ruyet, Didier; "Iterative Detection in MIMO Channels Using Particle Filtering"; IEEE Communications Society, 2004 IEEE; pp. 2694-2698.

* cited by examiner

*Primary Examiner* — Sam K Ahn
(74) *Attorney, Agent, or Firm* — Steven A. Shaw; W. James Brady; Frederick J. Telecky, Jr.

(57) ABSTRACT

Embodiments provide systems and methods for improved multiple-input, multiple-output (MIMO) detection comprising generating at least one list of candidate vectors by employing lattice enumeration which approximates hyperellipsoid detection search space and calculating a reliability of the candidate vectors. At least one advantage to embodiments is that improved detection occurs because detection can be performed in a search space defined by the eigenvectors (which define the general shape of an ellipsoid/hyperellipsoid, depending upon number of dimensions) and eigenvalues (which provide the appropriate scaling in each direction of the eigenvectors) of the effective channel.

23 Claims, 5 Drawing Sheets

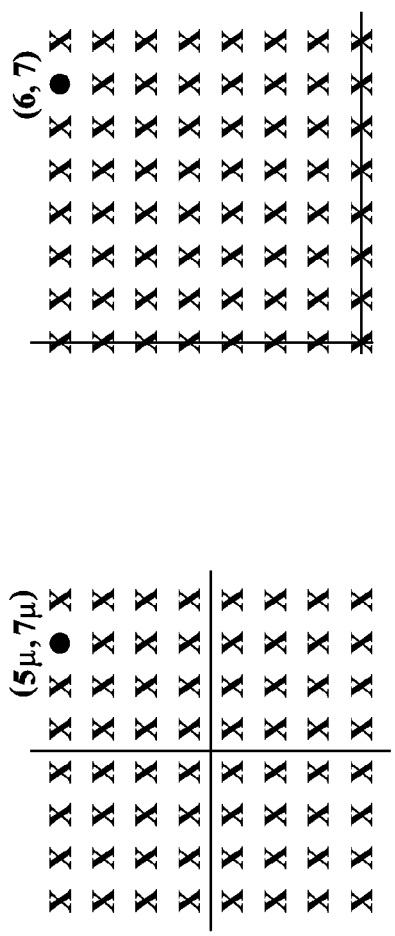
FIG. 3A
FIG. 3B
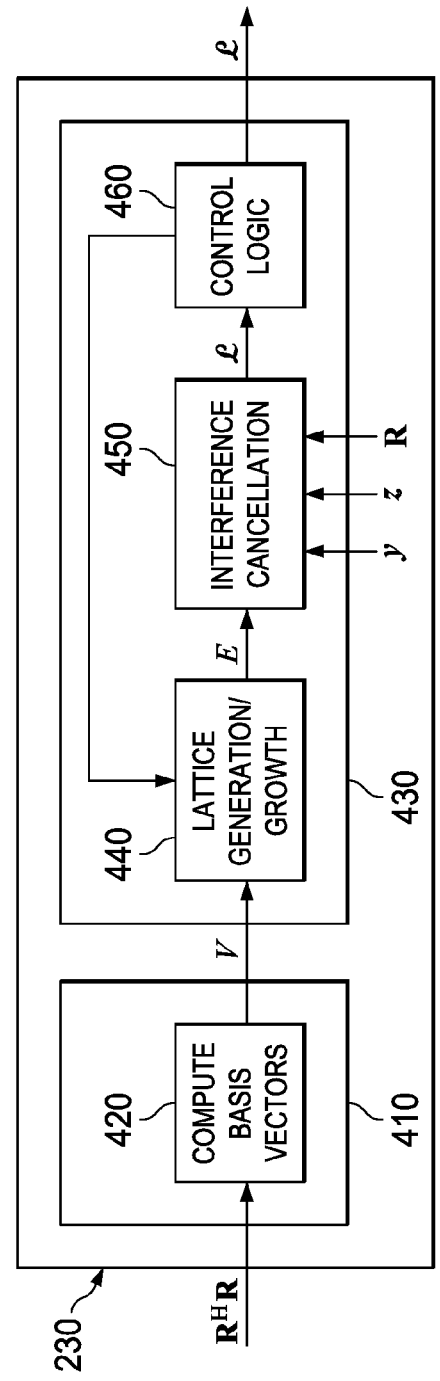
FIG. 4

US 7,945,008 B2

SYSTEMS AND METHODS FOR LATTICE ENUMERATION-AIDED DETECTION

CROSS-REFERENCE TO RELATED APPLICATIONS

The present application claims priority to U.S. provisional patent application Ser. No. 60/890,128, filed Feb. 15, 2007 and entitled "Lattice Enumeration-Aided Detector (LEAD)", hereby incorporated herein by reference.

BACKGROUND

As consumer demand for high data rate applications, such as streaming video, expands, technology providers are forced to adopt new technologies to provide the necessary bandwidth. Multiple Input Multiple Output ("MIMO") is an advanced radio system that employs multiple transmit antennas and multiple receive antennas to simultaneously transmit multiple parallel data streams. Relative to previous wireless technologies, MIMO enables substantial gains in both system capacity and transmission reliability without requiring an increase in frequency resources.

MIMO systems exploit differences in the paths between transmit and receive antennas to increase data throughput and diversity. As the number of transmit and receive antennas is increased, the capacity of a MIMO channel increases linearly, and the probability of all sub-channels between the transmitter and receiver fading simultaneously decreases exponentially. As might be expected, however, there is a price associated with realization of these benefits. Recovery of transmitted information in a MIMO system becomes increasingly complex with the addition of transmit antennas.

Many multiple-input multiple-output (MIMO) detection algorithms have been previously proposed in the literature. The optimal algorithm is conceptually simple, but is often impractical due to the fact that its complexity increases exponentially with the number of channel inputs. As a result, many algorithms have been proposed to solve the problem with less complexity, with the unfortunate effect of also significantly sacrificing performance.

Many MIMO detectors have been proposed and implemented as exclusively hard detectors that only give the final estimate of the channel input. Most notable is the sphere decoding detector because it can achieve the performance of the optimal brute force detector in an uncoded system with much less complexity on average. A summary of many MIMO detectors may be found in D. W. Waters, "Signal Detection Strategies and Algorithms for multiple-Input Multiple-Output Channels", Georgia Institute of Technology, PhD dissertation, December 2005, including many variations of the sphere detector that minimize complexity without sacrificing performance. One enhancement to a sphere detector is to maintain a list which enables the computation of the so-called log-likelihood ratio (LLR), which ratio provides reliability information for each bit. See, for example, B. Hochwald, S. ten Brink, "Achieving Near-Capacity on a Multiple-Antenna Channel," *IEEE Transactions on Communications*, vol. 51, no. 3, March 2003, which discusses computing this LLR information using a list-sphere detection approach. Unfortunately, implementing existing MIMO detectors like the list-sphere detector is still quite complex, requiring significant processing resources.

Improvements are desired to achieve a favorable performance-complexity trade-off compared to existing MIMO detectors.

BRIEF DESCRIPTION OF THE DRAWINGS

For a detailed description of exemplary embodiments of the invention, reference will be made to the accompanying drawings in which:

FIG. 3 illustrates an example integer alphabet conversion for a 64-QAM alphabet;

FIG. 4 is a high-level block diagram of list generation, according to embodiments;

NOTATION AND NOMENCLATURE

Figure 1:
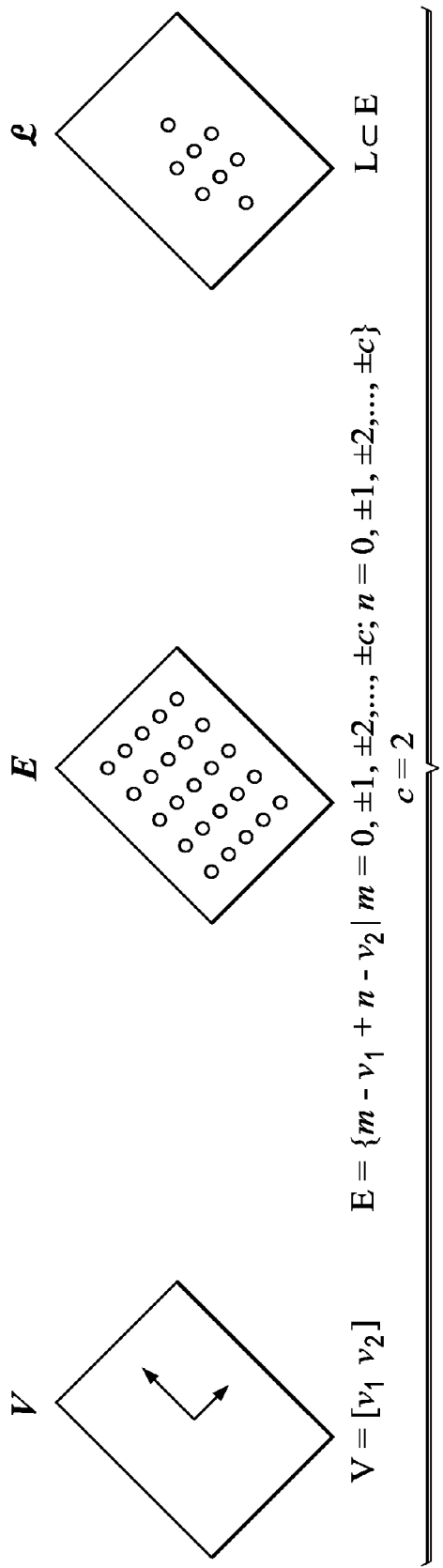
FIG. 1 illustrates example basis and lattices.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. The term "system" refers to a collection of two or more hardware and/or software components, and may be used to refer to an electronic device or devices or a sub-system thereof. Further, the term "software" includes any executable code capable of running on a processor, regardless of the media used to store the software. Thus, code stored in non-volatile memory, and sometimes referred to as "embedded firmware," is included within the definition of software. Moreover, it should be understood that embodiments of a lattice enumeration-aided detector may also be referred to in a shorthand fashion as "LEAD" in portions of this disclosure.

DETAILED DESCRIPTION

It should be understood at the outset that although exemplary implementations of embodiments of the disclosure are illustrated below, embodiments may be implemented using any number of techniques, whether currently known or in existence. This disclosure should in no way be limited to the exemplary implementations, drawings, and techniques illustrated below, including the exemplary design and implementation illustrated and described herein, but may be modified within the scope of the appended claims along with their full scope of equivalents.

In light of the foregoing background, embodiments enable improved multiple-input multiple-output (MIMO) detection using lattice-enumeration which approximates a hyperellipsoid detection search space in N-dimensions. Although the detection search space will be often referred to generally in this disclosure as hyperellipsoid, it should be appreciated that such term is intended to encompass when N=2, the detection search space is an ellipse; when N=3, the detection search space is an ellipsoid; and when N=4 (or greater), the detection search space is a hyperellipsoid. At least one advantage to embodiments is that improved detection occurs because detection can be performed in a search space defined by the eigenvectors (which define the general shape of an ellipsoid/hyperellipsoid, depending upon the number of dimensions) and eigenvalues (which provide the appropriate scaling in each direction of the eigenvectors) of the effective channel. Another advantage to embodiments is that detection can be performed over a regular alphabet which is independent of the channel.

Although embodiments will be described for the sake of simplicity with respect to wireless communication systems, it should be appreciated that embodiments are not so limited, and can be employed in a variety of communication systems. Moreover, although embodiments will be described in connection with a sphere detector, it should be understood that embodiments may alternatively be used with other detectors.

To better understand embodiments of this disclosure, it should be appreciated that the MIMO detection problem—namely, to recover the channel inputs given the channel outputs when there are multiple inputs and outputs—can be described using a narrowband channel model written as:

$$r = Ha + w, \quad (1)$$

where H is an M×N channel matrix, a is the transmitted data (channel inputs) vector such that $a=[a_1\ a_2\ \ldots\ a_N]^T$ is an N dimensional vector of symbols that may be drawn from different alphabets, w is the noise vector, and the noise has the autocorrelation matrix $E[ww^*]=\Sigma^2$. The narrowband channel model can be applied to broadband channels when orthogonal frequency division multiplexing (OFDM) is used. In the OFDM case, each sub-carrier is modeled according to equation (1). Thus, the embodiments disclosed here can easily be extended to apply to broadband channels.

Although the present discussion focuses on the case where $\Sigma^2 = I\sigma^2$, it should be understood that embodiments are extendable to the more general case. For example, and not by way of limitation, one can pre-multiply r in equation (1) by $\Sigma^{-1}$ (see, for example U.S. patent application Ser. No. 12/022,927 for "Systems and Methods for Scaling to Equalize Noise Variance", incorporated herein by reference); this operation effectively whitens the noise. As a result, if one operates on $\Sigma^{-1}r$ instead of r, then the original assumption holds—namely, that the noise is white and uncorrelated between branches, and the variance is one, i.e., $\sigma^2=1$.

One way to implement a MIMO detector of embodiments uses a QR decomposition of the channel. This decomposition is defined as follows:

$$\begin{bmatrix} H \\ \alpha \hat{\sigma} I \end{bmatrix} \Pi = \begin{bmatrix} Q \\ \alpha \hat{\sigma} \Pi R^{-1} \end{bmatrix} R \quad (2)$$
$$= \tilde{Q}R,$$

where $\tilde{Q}$ is an (M+N)×N matrix with orthonormal columns, R is an N×N triangular matrix with positive and real diagonals, $\Pi$ is an N×N permutation matrix, and $\hat{\sigma}$ is an estimate of $\sigma$, and $\alpha$ is a chosen parameter (example values are 0 and 1). Although the present discussion describes embodiments assuming a lower triangular R matrix, it should be understood that embodiments can easily be extended to describe an upper triangular matrix instead.

The value of the parameter $\alpha$ depends on the type of MIMO detector that is used. For example, and not by way of limitation, $\alpha=1$ is optimal for a linear receiver because it minimizes the mean squared error (MSE), $\|R^{-1}Q^H y - s\|^2$. On the other hand, $\alpha=0$ is often a useful choice. It will be appreciated that in general the parameter $\alpha$ can take on any value.

A permutation matrix is an identity matrix after its columns have been permuted. The way the permutation matrix $\Pi$ is defined impacts performance for some MIMO detectors. For example, BLAST ordering, an example of which is discussed in G. J. Foschini, G. Golden, R. Valenzuela, and P. Wolniansky, "Simplified processing for high spectral efficiency wireless communication employing multi-element arrays," *IEEE J. Selected Areas in Communication*, vol. 17, no. 11, pp. 1841-1852, 1999, chooses $\Pi$ to maximize the minimum diagonal of R. A less complex way to choose $\Pi$ is a sorted-QR decomposition, such as, for example, is discussed in D. Wubben, R. Bohnke, J. Rinas, V. Kuhn, and K. Kammeyer, "Efficient algorithm for decoding layered space-time codes," *Electronic Letters*, vol. 37, no. 22, pp. 1348-1350, October, 2001, that attempts to maximize $R_{1,1}$ (assuming a lower triangular R).

Thus, the MIMO detector problem can be simplified by creating an effective channel that is triangular. The process of creating an effective channel that is triangular is called MIMO equalization. One such method of triangularizing a channel uses the conjugate transpose of Q (resulting from the QR decomposition of the channel H) as follows:

$$y = Q^H r = Rs + n \quad (3)$$

where $s = \Pi^{-1} a = [s_1\ s_2\ \ldots\ s_N]^T$ is a permutation of the channel input vector, and n is an effective noise, and the superscript H denotes the conjugate transpose operation; note that n may be a function of a when $\alpha \neq 0$. The i-th symbol is defined as $s_i$ and is an element of the constellation $A_i$. The set containing all valid values of a subset of the channel inputs is denoted as $A_{N_1}^{N_2}$, this means $[s_{N_1}, s_{N_1+1}, \ldots, s_{N_2}]^T \in A_{N_1}^{N_2}$ where $N_1 \leq N_2$. The set that contains all the elements of any one-dimensional constellation A whose j-th bit have the value k is denoted as A(k,j). For example, $A_i(k,j)$ is the set of all valid values of $s_i$ whose j-th bit have the value k. The set that contains all the elements of any multi-dimensional constellation, $A_{N_1}^{N_2}$, whose j-th bit in the i-th symbol have the value k is denoted as $A_{N_1}^{N_2}(k,i,j)$ For example, $A_1^N(k,i,j)$ may be employed to denote the set of all valid channel input values of s whose j-th bit in the i-th symbol maps to the value k.

The output of a MIMO detector is often the log-likelihood ratio (LLR) of each bit transmitted in the vectors. The LLR value indicates the probability that a given bit was transmitted as a one or zero. The detector output for the j-th bit of the i-th symbol is described by a single equation:

$$\lambda_{i,j} = \left( \min_{s^{(0)} \in A_1^N(0,i,j)} \|r - H\Pi s^{(0)}\|^2 - \min_{s^{(1)} \in A_1^N(1,i,j)} \|r - H\Pi s^{(1)}\|^2 \right) \Big/ \hat{\sigma}^2, \quad (4)$$

where $\|r - H\Pi s^{(k)}\|^2$ is minimized under the constraint that $s^{(k)} \in A_1^N(k,i,j)$. It should be understood that this is only one example of how an LLR may be computed, and should not be used as a limitation on the embodiments disclosed or invention claimed. Also, the value $\|r - H\Pi x\|^2$ is defined as the mean-squared error (MSE) or cost of the vector x. It should be understood that the mean-squared error is one kind of cost that can be used for processing the signal. One example, and not by way of limitation, is discussed in U.S. patent application Ser. No. 12/022,663 for "Efficient Mean Square Error (MSE) Calculation for Lattice Elements", hereby incorporated herein by reference.

A max-log detector may also be defined using an equivalent triangular channel model:

$$\lambda_{i,j} = \left( \min_{s^{(0)} \in A_1^N(0,i,j)} \|y - Rs^{(o)}\|^2 - \min_{s^{(1)} \in A_1^N(1,i,j)} \|y - Rs^{(1)}\|^2 \right) / \hat{\sigma}^2, \quad (5)$$

where $\|y-Rs^{(k)}\|^2$ is minimized subject to the constraints $s^{(k)} \in A_1^N(k,i,j)$, and $\alpha=0$, and where $\Pi$ can be any permutation matrix. Note that $\|y-Rs\|^2 = \|r-H\Pi s\|^2$ when $\alpha=0$.

Many MIMO detectors are classified as list detectors. A list detector is any detector that generates a list of candidate vectors for the channel input. The set of candidate vectors is labeled as the set $\mathcal{L}$, and the number of candidates in the set is called the list length L, i.e. $L=\mathcal{L}$. One choice for an optimal list detector is one with an exhaustive list, i.e. $\mathcal{L}=A_1^N$. It is, however, desirable for list detectors to generate their lists to be as small as possible without sacrificing too much performance. One example of a high-performing list detector is called the list-sphere detector. For a given channel realization, a list-sphere detector computes its list $\mathcal{L}$ such that each of the L candidate vectors it contains has a smaller MSE $\|r-H\Pi\hat{s}\|^2$ than any possible channel input outside the list $\mathcal{L}$, i.e. $\|r-H\Pi\hat{s}\|^2 \leq \|r-H\Pi q\|^2$ for any $\hat{s} \in \mathcal{L}$ and $q \notin \mathcal{L}$, where the i-th elements of $\hat{s}$ and q belong to the constellation $A_i$.

Given the set $\mathcal{L}$ generated by any list detector, the LLR for the j-th bit of the i-th symbol may be computed in a manner similar to the detector in equations (4) and (5):

$$\lambda_{i,j} = \left( \min_{s^{(0)} \in \mathcal{L} \cap A_1^N(0,i,j)} \|y - Rs^{(o)}\|^2 - \min_{s^{(1)} \in \mathcal{L} \cap A_1^N(1,i,j)} \|y - Rs^{(1)}\|^2 \right) / \hat{\sigma}^2, \quad (6)$$

where $\|y-Rs^{(k)}\|^2$ is minimized subject to the constraint $s^{(k)} \in \mathcal{L} \cap A_1^N(k,i,j)$.

Finding the vector $\hat{s}$ that maximizes $\Pr[y|s=\hat{s}]$ over a range of possible values is an important challenge for MIMO detection. This can be written as:

$$Pr[y|s=\hat{s}] = \min_{\hat{s} \in A_1^N} |y - R\hat{s}|^2,$$

where $A_N^1$ is the set of all possible channel inputs. This detection challenge is directly related to the probability $\Pr[y|s=\hat{s}]$, which can be fully described in terms of a tree search. An example discussion of using a tree search to describe such a probability may be found in J. R. Barry, E. A. Lee, and D. G. Messerschmitt, *Digital Communication*, 3$^{rd}$ edition, Kluwer Academic Publishers, 2004, chapter 10. The number of branches exiting the root node corresponds to the number of possible values for the first symbol. Likewise the number of branches exiting the nodes preceding the i-th level corresponds to the number of possibilities for the i-th symbol. In the end, there are $$\prod_{i=1}^{N} |A_i|$$

total leaf nodes in the tree. A sphere detector finds the leaf node with the smallest cost in a computationally-efficient manner [Barry, et al., supra]. The "cost" of any node is the sum of the scores of all the branches in the path back to the root node, where every branch in the tree is associated with a unique score. The score of a branch exiting a node at the i-th level can be written as:

$$Score = |p_i - R_{i,i}\hat{s}_i|^2,$$

where $p_i$ is the result of an interference cancellation procedure. The interference cancellation procedure is defined as:

$$p_i = y_i - \sum_{j=1}^{i-1} R_{i,j} \hat{s}_j, \quad (7)$$

where $R_{i,j}$ is the j$^{th}$ element from the i$^{th}$ row of the matrix R, $y_i$ is defined by equation (3) and $[\hat{s}_1 \ldots \hat{s}_{i-1}]^T$ are the symbols from the path that connects the current branch back to the root node.

A sphere detector, examples of which are discussed in A. Chan and I. Lee, "A new reduced-complexity sphere decoder for multiple antenna systems," *IEEE Conference on Communications*, pp. 460-464, 2002, uses a depth-first approach to find the leaf node with minimum cost. It uses a greedy search approach to find the first leaf node, thereby establishing a cost threshold. Then it begins its depth-first search from that first leaf node. As the detector seeks lower cost leaf nodes, it prunes branches leading to nodes whose cost exceeds the threshold. This approach is effective because the cost of a particular path can only increase from one level to the next. If a leaf node with a cost below the threshold is found during the search, then that leaf node becomes the preliminary result of the search and the threshold is accordingly reduced. The search continues until each leaf node's path has either been pruned, or its cost has been computed.

All possible channel input vectors are points on a regular and bounded lattice where each element of the channel input vector is selected from a given constellation alphabet. The tree-search technique searches through all points to find the one with the lowest cost. The search technique described above is called sphere detection because it does not search through those points outside the hypersphere defined by the value of the initial radius, or the cost of the first leaf node. As leaf nodes with lower costs are found, the radius shrinks thereby reducing complexity by excluding more points from its search. Discussion of bounding a search geometry may be found in U.S. patent application Ser. No. 12/022,652 for "Wireless Signal Detection Using a Transformed Lattice Boundary", incorporated hereby by reference.

One technique sometimes used to reduce complexity is to set an initial threshold—this is equivalent to establishing the radius of the hypersphere before any computations are done; an illustrative example may be found in W. Zhao, G. B. Giannakis, "Sphere decoding algorithms with improved radius search," *IEEE Communications and Networking Conference*, vol. 4, p. 2290-2294, March 2004. The risk is that the hypersphere may exclude all points; then the radius would have to be expanded and the search continued. On the other hand, if the initial hypersphere contains only a few points then it can find the solution with low complexity. The origin of the hypersphere is also important to reducing complexity. Ideally, the distance from the origin to the point with the lowest cost is minimized, so as to exclude as many points as possible from the search. The most common origin for the hypersphere is the point y.

Computing the LLR values for each bit requires a list of candidate vectors, or leaf nodes, not just the one with minimum cost. For example, implementing the best Max-Log-MAP detector exactly would require at least two candidate vectors, and at most $\log_2(|A_1^N|)+1$ candidate vectors in order for all possible bit values to be represented in the list of candidate vectors.

It is possible to represent a complex channel model with only real variables through a simple transformation. Specifically, the following equation is equivalent to equation (1):

$$\begin{bmatrix} r_R \\ r_I \end{bmatrix} = \begin{bmatrix} H_R & -H_I \\ H_I & H_R \end{bmatrix} \begin{bmatrix} a_R \\ a_I \end{bmatrix} + \begin{bmatrix} w_R \\ w_I \end{bmatrix}, \quad (8)$$

where the subscripts R and I denote the real and imaginary coefficients, respectively, of the preceding matrix or vector. Any MIMO detector can operate on this real channel model by adapting the input symbol alphabet, taking the channel matrix to be the 2M×2N channel matrix in equation (8), taking the channel output to be the 2M×1 vector on the left-hand side of equation (8), and decomposing the complex input symbol alphabet and noise into their real and imaginary components. For example, and not by way of limitation, a q-ary quadrature amplitude modulation (QAM) alphabet becomes a $\sqrt{q}$-ary pulse amplitude modulated (PAM) alphabet to accommodate the transformation to the real channel model.

To better understand present embodiments, a word now concerning lattices. A lattice is defined as the set of all linear combinations of a set of linearly independent basis vectors $\{b_1, b_2, \ldots, b_N\}$. In terms of the matrix $B=[b_1, b_2, \ldots, b_N]$, the lattice points can be written as Bx, where x is a vector of real integers. An example of this is illustrated FIG. 1. In this particular illustrated example, V is the basis used by embodiments to generate the lattice E, where E is the linear combination of basis vectors $v_1$ and $v_2$ for integer coefficients −2, −1, 0, 1, and 2. This figure also illustrates a list constructed from a given lattice. Specifically, and because FIG. 1 is two-dimensional, the list of candidate vectors $\mathcal{L}$ is simply an ellipsoidal subset of the lattice E.

Traditionally, lattices have been described using real numbers, but for MIMO detection it is useful to also define lattices using complex numbers. A "complex integer" is defined as a complex number where the real and imaginary parts are both integers. A symbol from a QAM alphabet is an example of a complex integer. A "complex lattice" is defined as the set of all linear combinations of a set of linearly independent basis vectors $\{b_1, b_2, \ldots, b_N\}$ with complex integer coefficients. The lattice dimension is defined as the number (N) of basis vectors. In terms of the matrix $B=[b_1, b_2, \ldots, b_N]$, the lattice points can be written as Bx, where x is a vector of complex integers.

Figure 2:
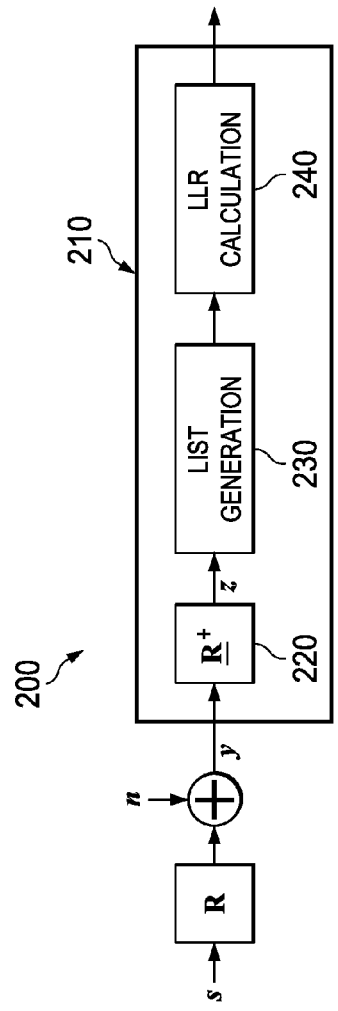
FIG. 2 is a high-level block diagram of an effective channel model applied to a lattice enumeration-aided detector (LEAD) system, according to embodiments.

As a result, embodiments of lattice enumeration-aided detection can significantly improve MIMO detection. A high level block diagram of an embodiment 200 of an effective channel model applied to a LEAD system 210 is shown in FIG. 2. For ease of understanding, embodiments will be described using the equivalent system model based on the QR decomposition or triangularization of the channel matrix described in equation (3). It should be appreciated that this is simply for convenience; other system models may alternatively be used, e.g., working directly on the system described by equation (1), etc.

In the particular embodiment illustrated in FIG. 2, where s is the permutation of channel input vector, and n is the effective noise, the received signal y is filtered (filter 220) by, for example, a minimum mean-square error (MMSE) equalizer to produce an output z:

$$z = \underline{R}^+ \begin{bmatrix} y \\ 0 \end{bmatrix}$$

where MMSE equalizer 220 is given by:

$$\underline{R}^+ = (\underline{R}^H \underline{R})^{-1} \underline{R}^H$$

$$\underline{R} = \begin{bmatrix} R \\ \hat{\sigma} I_{N \times N} \end{bmatrix}$$

The output, z, of equalizer 220 is used as the seed for a list generation process. It should be appreciated that equalizer 220 may instead be a zero-forcing equalizer, or other desired filter. The list generated by list generator 230 in embodiments of detector 210 is an approximation of the optimal list using lattice enumeration. The resulting list is used by list detector 240 (sometimes referred to herein as a reliability calculator 240) to compute per-bit or per-symbol likelihoods (LLRs) which are passed to the outer decoder.

Embodiments employ a shifting and scaling of the input alphabet to simplify list generation. Normally, transmitted alphabets are constructed to have unit energy. For QAM alphabets this means that the alphabet is centered at the origin and the values for the transmitted vectors are floating point numbers. By performing a shifting and scaling operation, it is possible to translate these vectors into complex integer vectors. For example, in two dimensions, a QAM alphabet composed of floating point elements over all quadrants can be transformed into an alphabet consisting of only complex integer entries in the first quadrant. After scaling and shifting, the effective alphabet has elements that belong to the set c+jd, where c and d are integers ranging from 0 to $\sqrt{q}-1$, where the QAM alphabet is q-ary in size. FIG. 3 shows an example, and not by way of limitation, of such an integer alphabet conversion from the floating point unit energy alphabet A to an effective transmission alphabet B which is restricted to complex integers in the first quadrant. For clarification, an example transmission vector is given with coordinates (5μ, 7μ) where $\mu=1/\sqrt{42}$. The effective coordinate of this point after translation is (6, 7). The element in A that corresponds to an element in B can be computed according to:

$$a = \mu(1-\sqrt{q}+2b).$$

An equivalent representation of the original channel model in equation (1) can be written as:

$$r' = \frac{r}{2\mu} - H\left(\frac{1-\sqrt{q}}{2}\right) \quad (9)$$

$$= Hb + w'.$$

More generally, a QAM alphabet of arbitrary dimension can be translated into the positive non-zero hyperquadrant using the preceding equations.

In MIMO communications, a noiseless channel output can be viewed as a lattice point. The basis of this lattice is the channel matrix R, and the transmission alphabet is a subset of the complex integer set. A sphere detector finds the lattice point that most closely matches the noisy channel output y in terms of mean-squared error (MSE). Consequently, the list detection problem can be simplified to finding the set of lattice points closest to y. For a list sphere detector, an example of which is discussed in Hochwald, et al. [supra], the optimal detection geometry is a hypersphere because the goal of a list sphere detector is to find the lattice elements of minimum Euclidean distance to y.

In embodiments, a received signal is passed through an equalizer (220 of FIG. 2, for example), which is a linear transformation. It should be appreciated that a linear transformation of a circle is an ellipse, while in higher dimensions, a linear transformation of a hypersphere is a hyperellipsoid. Therefore, according to embodiments, the preferred detection search space is a hyperellipsoid. Embodiments are constrained to search for candidate vectors in this detection space, resulting in improved detection. The shape of the hyperellipsoid detection space is at least approximated by, and preferably defined by both the eigenvalues and eigenvectors of $R^H R$, where R is the effective channel, and preferably R has been triangularized. These eigenvectors define the general shape of the hyperellipsoid, whereas the eigenvalues define the appropriate scaling in each direction of the eigenvectors. Note that $R^H R$ is a Hermitian matrix and therefore has real eigenvalues; as a result, the eigenvectors with distinct eigenvalues are orthogonal.

Since the input alphabet is also typically complex, there are generally 2N real dimensions to be searched. 2N different search directions can be generated by using the original eigenvectors and +j times the original eigenvectors, which results in a total of 2N eigenvectors. Additionally, it is preferable to scale these 2N eigenvectors by the eigenvalues of $R^H R$ such that the search is biased in the direction of the weakest symbol. Two possible scaling options are $\lambda$ and $\sqrt{\lambda}$; it should be understood that other scaling options are also possible.

FIG. 4 depicts a high level block diagram of list generator 230, consisting of pre-processing stage 410 and core-processing stage 430. Pre-processing stage 410 computes the basis vectors (420) which are used to enumerate the corresponding lattice. In this figure, V is composed of the basis vectors for at least approximating the hyperellipsoid detection space, E is the lattice created from these basis vectors, and $\mathcal{L}$ is the list of valid candidates that are used to compute the LLRs. Core processing stage 430 uses the input basis vectors, V, to build or generate the corresponding lattice (440). The lattice is generated (440) by creating all linear combination of the elements of V up to and including a given maximum integer coefficient. Note that the lattice E is centered at z, the output of MMSE equalizer 220 (FIG. 2). Given the lattice E, successive interference cancellation techniques (450) may be used to reduce and refine the set of lattice points that are valid candidates for the list $\mathcal{L}$. It should be understood that core processing 430, and especially the linear combinations, can be performed as one-pass or iteratively; in the latter, the lattice is grown until it is just large enough to create a list of desired length. For the sake of ease of understanding, the following discussion will assume an iterative approach; it should be appreciated that this should in no manner limit the scope of the disclosure or the appended claims. Control logic 460 receives the refined list $\mathcal{L}$ of valid candidate vectors from interference cancellation module 450 and is responsible for looping core processing 430 until the desired number of candidates on the list is full.

In general, embodiments are capable of performing detection for an arbitrary number of detection streams. For the sake of simplicity, the following discussion is limited to the case of two detection streams; it should be understood that embodiments are also applicable to more or less detection streams.

Figure 5:
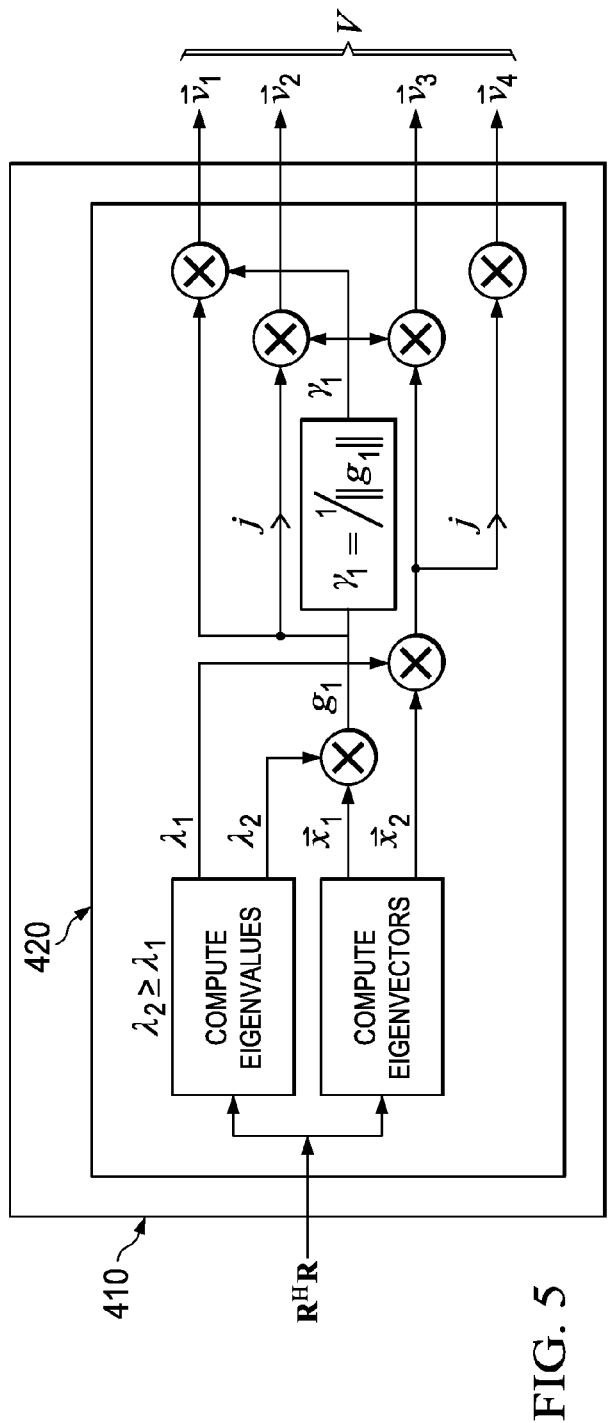
FIG. 5 is a high-level block diagram of a preprocessing stage for a two-stream LEAD, according to embodiments.

FIG. 5 presents a block diagram of pre-processing stage 410 for a two-stream lattice enumeration-aided detector. Solely for the sake of this illustrated example, two eigenvalues and two eigenvectors are initially computed. The eigenvectors are first scaled by the eigenvalues (or square root of the eigenvalues) and normalized such that the largest vector produced has unit norm. Selecting the largest magnitude vector to have unit norm is preferred because translation places all valid candidates on the integer lattice.

In compute basis vectors unit 420 of pre-processing stage 410, the eigenvalues corresponding to each eigenvector are swapped. This is preferably accomplished by multiplying the first eigenvalue with the eigenvector corresponding to the second eigenvalue and vice versa. As a result, the search is weighted in the direction most likely to make an error because the search is now skewed in the direction of the smallest eigenvalue (the direction where an error is most likely to occur), rather than the direction of the strongest eigenvalue (the direction where an error is least likely to occur). An additional two eigenvectors are generated by multiplying the original two eigenvectors by the complex number +j. This complex multiplication produces the basis vectors $\vec{v}_2$ and $\vec{v}_4$ for the equivalent 2N real system model.

Figure 6:
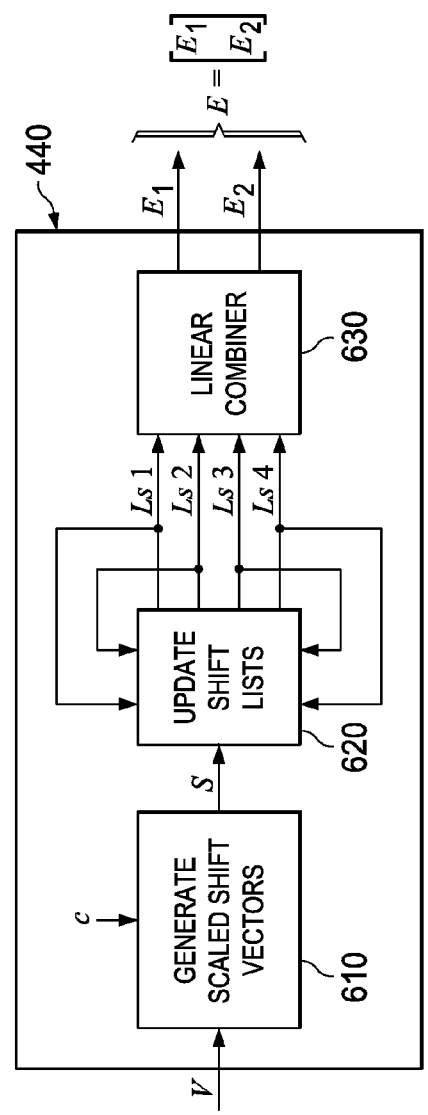
FIG. 6 illustrates a lattice generation block diagram, according to embodiments.

FIG. 6 illustrates a block diagram of lattice generation/growth module 440, which generates lattice E from the set of input basis vectors V. The end result, lattice E, is the enumeration of all linear combination of the elements of V up to and including a given maximum integer coefficient. The lattice generation begins by scaling (610) the basis vectors v1 through v4 by an integer coefficient c. Note that c is initialized to zero and that for each core processing iteration c is incremented by one.

On the first pass the scaled versions of the basis vectors are simply the basis vectors themselves because c=1, therefore the general expression S=cV simplifies to S=V. As the iterations proceed and c is increased, scaled shift vector generator 610 multiplies the basis vectors by the value of c where S=cV. For the example illustrated in FIG. 6, $$S = [\, c\vec{v}_1 \quad c\vec{v}_2 \quad c\vec{v}_3 \quad c\vec{v}_4 \,]$$
$$= [\, \vec{s}_1 \quad \vec{s}_2 \quad \vec{s}_3 \quad \vec{s}_4 \,]$$

where S is the set of scaled shift vectors.

Shift list updater 620 initializes the lists of shift vectors, Ls1 through Ls4 in the present example, to empty sets. These lists of shift vectors will be used by linear combiner 630. In the first pass of updater 620, Ls1=s1, Ls2=s2, Ls3=s3 and Ls4=s4. In subsequent iterations of updater 620, Ls1 becomes the union of the retained Ls1 from the previous iteration and s1. Similarly, Ls2 is the union of the retained Ls2 from the previous iteration and s2, and so on. Consequently, the lists of shift vectors grow linearly with the iteration number. Lastly, lattice generator 440 linearly combines (630) all shift lists Ls1 through Ls4. The output of linear combiner 630 is the lattice E. Thus, E, for the example of FIG. 6, is a set of all linear combinations of Ls1, Ls2, Ls3, and Ls4.

Given the present example of a two-stream detector the elements of E are grouped into complex vectors $E_1$ and $E_2$, where $E_1$ corresponds to the first complex symbol and $E_2$ corresponds to the second complex symbol.

Note that the vectors $\vec{v}_3$ and $\vec{v}_4$ often do not need to be maintained in order to achieve good performance because their norms are often significantly less than the norms of $\vec{v}_1$ and $\vec{v}_2$. For this reason, some embodiments do not pass these vectors ($\vec{v}_3$ and $\vec{v}_4$) to the core processing stage, although this may result in a significant performance loss when their norms are relatively close to the norms of $\vec{v}_1$ and $\vec{v}_2$.

Figure 7:
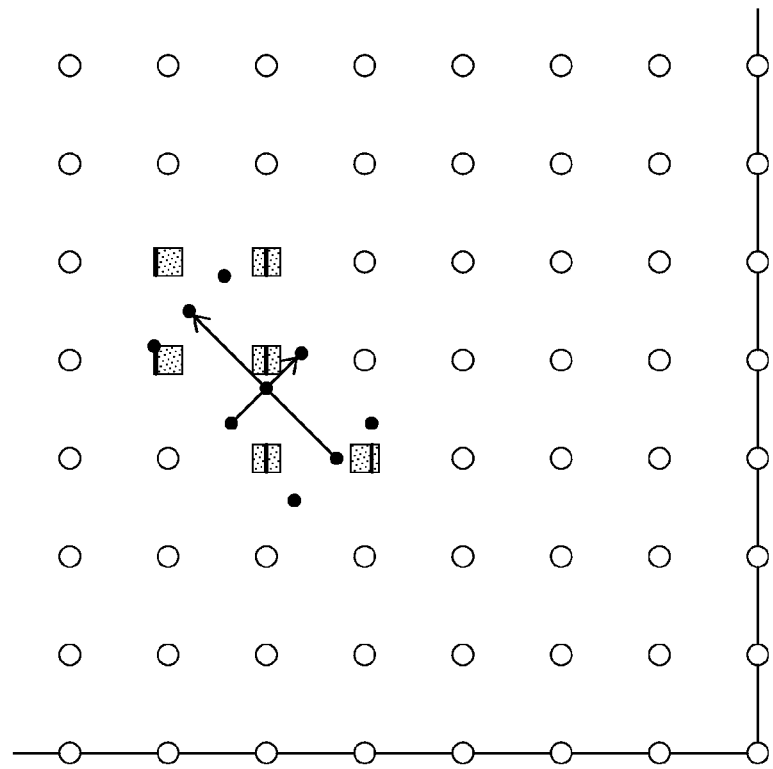
FIG. 7 illustrates an example of lattice enumeration in two real dimensions, according to embodiments.

FIG. 7 shows an example of a lattice enumeration over two real dimensions with coefficient=−1, 0, +1, according to embodiments. Elements of the lattice are denoted with the small filled black dots; in the illustrated example, there are a total of nine such dots. The lattice basis vectors are represented by the two orthogonal arrows originating from the central point of the lattice. Any point in the 8×8 overlaid grid is a possible candidate vector. In order to determine the list of candidate vectors, the lattice points are rounded to the nearest candidate vector. Note that some lattice points result in the same candidate vector. For example, in FIG. 7 (c=1) there are only six unique candidates vectors (denoted as squares) even though there are nine lattice points.

Figure 8:
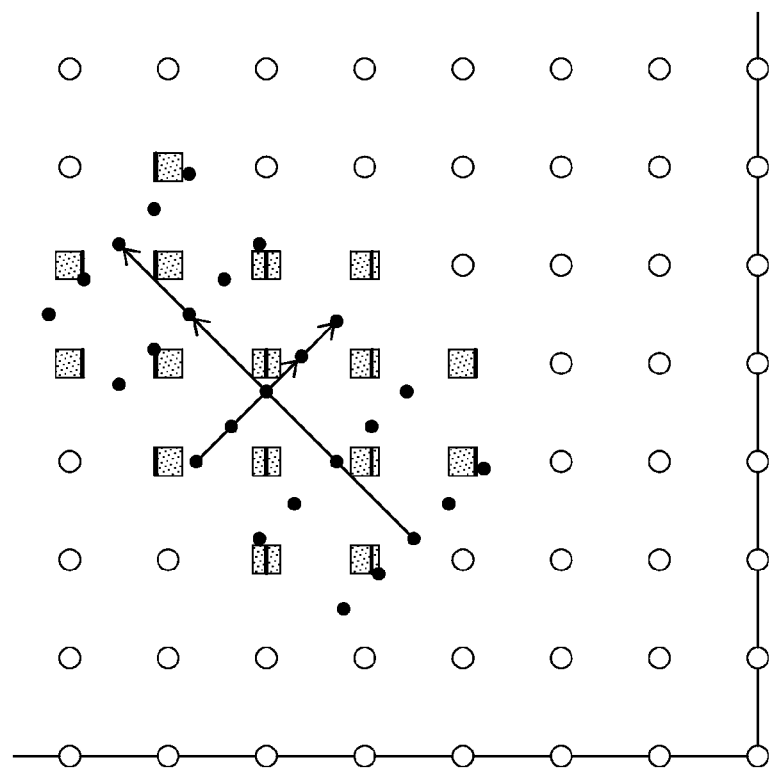
FIG. 8 illustrates an example of growth of the lattice enumeration of FIG. 7, according to embodiments.

If more than six candidate vectors are wanted, then c is incremented and the lattice is correspondingly increased or "grown". FIG. 8 depicts an example of the growth of the lattice of FIG. 7 where c=1 to c=2 to incorporate additional candidate vectors. As before, this lattice enumeration is in two real dimensions, this time with coefficient=−2, −1, 0, +1, +2. The lattice continues to grow until the candidate list is full at which point control logic 460 stops incrementing c and outputs the list from core processing stage 430. It should be understood that there are numerous ways to constrain the candidate list to the desired number of candidates. For example, and not by way of limitation, one can arbitrarily select from the newly added elements to E (caused by the increase in c) as the final candidates used to fill the list $\mathcal{L}$.

Figure 9:
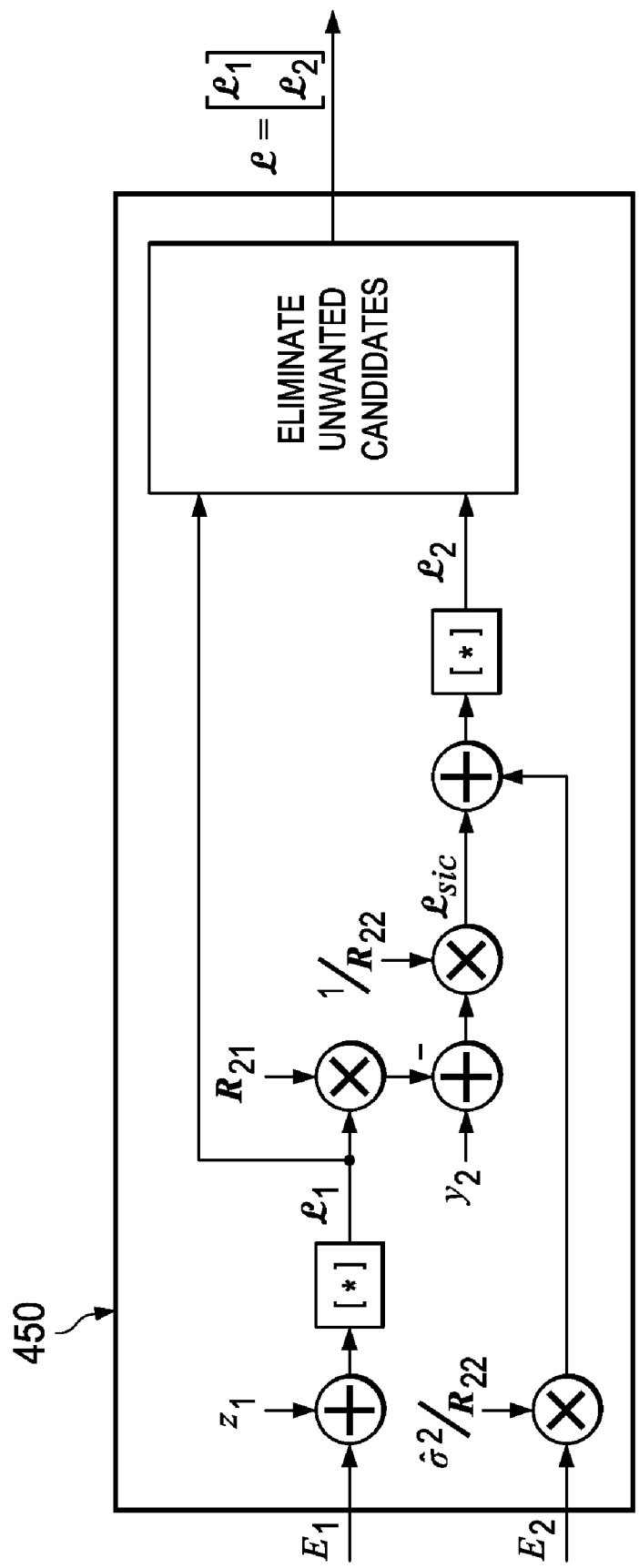
FIG. 9 illustrates a block diagram of successive interference cancellation, according to embodiments.

Prior to outputting the full list of candidate vectors, core processing stage 430, in some embodiments, implements successive interference cancellation 450. Such cancellation is preferred because it improves the overall performance of lattice enumeration-aided detector 210. It should be appreciated that interference cancellation 450 may be omitted, but at the risk of lower performance. A block diagram of interference cancellation module 450 is shown in FIG. 9. The illustrated inputs to interference cancellation module 450 are the outputs of MMSE equalizer 220 for the first detection symbol z1, received vector y, noise variance estimate $\hat{\sigma}^2$, lattice E and channel R.

Successive interference cancellation 450 generates a list of candidates for the first symbol ($\mathcal{L}_1$) by rounding the sum of $E_1$ and $z_1$ to the nearest constellation points. Because of the translation, a rounding operation is performed, denoted by [*] in FIG. 9, rather than a slicing operation because the translated input alphabet is on the integer lattice. The resulting decision estimates for the first transmitted symbol $\mathcal{L}_1$ are used for interference cancellation. Specifically, the vector $R_{21} \times \mathcal{L}_1$ is subtracted from $y_2$. Note that this subtraction is preferably a vector subtraction, meaning that $y_2$ is replicated to have the same dimensions as $\mathcal{L}_1$ before the subtraction occurs.

For decisions in the list $\mathcal{L}_1$ which are correct, the interference will be perfectly cancelled; otherwise error propagation occurs. Dividing $y_2 - R_{21} \mathcal{L}_1$ by $R_{22}$ results in a successive interference-cancelled list $\mathcal{L}_{SIC}$. Next, a scaled version of the second lattice symbol of E ($E_2$) is added to each element in the interference-cancelled list, and the results rounded to the nearest integer vector. The resulting values form $\mathcal{L}_2$. Again, this process is an integer rounding operation rather than a floating point slicing operation.

Lastly, interference cancellation module 450 ensures all elements in $\mathcal{L}$ are elements of the alphabet B by removing, or possibly performing a saturation rounding operation on, vectors which contain elements that are less than 0 or greater than $\sqrt{q}-1$, where q is the constellation size, to eliminate unlikely candidates. The output of this is the list $\mathcal{L}$. It should be understood that there is no need to check at this time whether the candidate vectors are integers, as this constraint has already been satisfied. List $\mathcal{L}$ is provided to LLR calculator 240 which in turn computes the per-bit likelihoods or log-likelihood ratios for the channel input and passes the results to the outer decoder.

Many modifications and other embodiments of the invention will come to mind to one skilled in the art to which this invention pertains having the benefit of the teachings presented in the foregoing descriptions, and the associated drawings. Therefore, the above discussion is meant to be illustrative of the principles and various embodiments of the disclosure; it is to be understood that the invention is not to be limited to the specific embodiments disclosed. Although specific terms are employed herein, they are used in a generic and descriptive sense only and not for purposes of limitation. It is intended that the following claims be interpreted to embrace all such variations and modifications.

What is claimed is:

1. A multiple-input, multiple-output (MIMO) system, comprising:
   a list generator which at least approximates hyperellipsoid detection search space comprising a module for computing basis vectors by shifting and scaling an input alphabet prior to list generation; and
   a reliability calculator.

2. The system of claim 1, wherein the list generator is aided by lattice enumeration.

3. The system of claim 1, wherein the reliability calculator is a log-likelihood ratio (LLR) calculator.

4. The system of claim 1, where the reliability calculator calculates at least one selected from the group of: per-bit reliability and per-symbol reliability.

5. The system of claim 1, wherein the list generator comprises an interference cancellation module.

6. The system of claim 1, wherein the list generator receives a filtered signal as an input.

7. The system of claim 1, wherein the list generator receives a triangularized signal as an input.

8. The system of claim 1, wherein the list generator generates a lattice from basis vectors.

9. The system of claim 1, wherein the module for computing basis vectors computes eigenvalues from the group comprising at least one of: a channel matrix and a decomposition of a channel matrix.

10. The system of claim 1, wherein the module for computing basis vectors computes eigenvectors from the group comprising at least one of: a channel matrix and a decomposition of a channel matrix.

11. A method for improved multiple-input, multiple-output (MIMO) detection, comprising:
    scaling and shifting an input alphabet;
    generating at least one list of candidate vectors by employing lattice enumeration which approximates hyperellipsoid detection search space; and
    calculating a reliability of the candidate vectors.

12. The method of claim 11, further comprising passing a received signal through an equalizer prior to the generating.

13. The method of claim 11, further comprising triangularizing a received signal prior to the generating.

14. The method of claim 11, wherein the generating further comprises computing basis vectors to use to enumerate a corresponding lattice.

15. The method of claim 14, wherein the computing basis vectors comprises computing eigenvalues from the group comprising at least one of: a channel matrix and a decomposition of a channel matrix.

16. The method of claim 14, wherein the computing basis vectors comprises computing eigenvectors from the group comprising at least one of: a channel matrix and a decomposition of a channel matrix.

17. The method of claim 11, wherein the generating further comprises generating a lattice from input basis vectors.

18. The method of claim 11, wherein the calculating further comprises calculating at least one log-likelihood ratio (LLR) from the at least one list of candidate vectors.

19. A method for improved multiple-input, multiple-output (MIMO) detection, comprising:
generating at least one list of candidate vectors comprising:
employing lattice enumeration which approximates hyperellipsoid detection search space;
employing successive interference cancellation to refine a set of lattice points corresponding to valid candidates; and
calculating a reliability of the candidate vectors.

20. A method for improved multiple-input, multiple-output (MIMO) detection, comprising:
generating at least one list of candidate vectors, comprising:
employing lattice enumeration which approximates hyperellipsoid detection search space;
iteratively incrementing a coefficient until list of valid candidate vectors is desired length; and
calculating a reliability of the candidate vectors.

21. A method for improved multiple-input, multiple-output (MIMO) detection, comprising:
generating at least one list of candidate vectors, comprising:
employing lattice enumeration which approximates hyperellipsoid detection search space;
scaling 2N eigenvectors to correspond to real dimensions in which to search for candidate vectors, wherein N is an integer; and
calculating a reliability of the candidate vectors.

22. A method for improved multiple-input, multiple-output (MIMO) detection, comprising:
generating at least one list of candidate vectors, comprising:
employing lattice enumeration which approximates hyperellipsoid detection search space, said generating comprising biasing the hyperellipsoid detection search space in a direction of a weakest symbol; and
calculating a reliability of the candidate vectors.

23. A method for improved multiple-input, multiple-output (MIMO) detection, comprising:
generating at least one list of candidate vectors, comprising:
employing lattice enumeration which approximates hyperellipsoid detection search space, said generating comprising cross-multiplying eigenvectors and eigenvalues; and
calculating a reliability of the candidate vectors.

* * * * *